United States Patent [19]

Brady

[11] 4,136,082
[45] Jan. 23, 1979

[54] FLAME-RETARDANT POLYOLEFINS

[75] Inventor: Donnie G. Brady, Bartlesville, Okla.

[73] Assignee: Phillips Petroleum Company, Bartlesville, Okla.

[21] Appl. No.: 846,462

[22] Filed: Oct. 28, 1977

Related U.S. Application Data

[60] Division of Ser. No. 657,821, Feb. 13, 1976, Pat. No. 4,096,113, which is a continuation-in-part of Ser. No. 488,668, Jul. 15, 1974, abandoned.

[51] Int. Cl.$^2$ ............................ C08K 5/17; C08K 5/52
[52] U.S. Cl. ......................... 260/45.9 AD; 260/42.45; 260/45.8 NE; 260/45.8 NT; 260/45.9 NP; 260/45.95 S
[58] Field of Search ............... 260/45.8 NE, 45.8 NT, 260/45.9 NP (U.S. only), 45.9 AD

[56] References Cited

U.S. PATENT DOCUMENTS

| | | | |
|---|---|---|---|
| 3,810,862 | 5/1974 | Mathis et al. | 260/45.9 NP |
| 3,839,276 | 10/1974 | Rohlfs et al. | 260/45.9 NP |
| 3,914,193 | 10/1975 | Fessler et al. | 260/45.8 NE |
| 3,936,416 | 2/1976 | Brady | 260/45.9 NP |
| 3,936,420 | 2/1976 | Gray | 260/45.9 NP |
| 4,010,137 | 3/1977 | Brady | 260/45.8 NT |
| 4,026,810 | 5/1977 | Bost | 260/45.7 P |
| 4,043,975 | 8/1977 | Bost | 260/45.8 NT |

*Primary Examiner*—Donald E. Czaja
*Assistant Examiner*—R. A. White

[57] ABSTRACT

The fire-retardant properties of polyolefin compositions containing certain phosphorus-containing flame retardants are increased by incorporating an amine hydrohalide salt, e.g., ethylenediamine dihydrobromide.

15 Claims, No Drawings

FLAME-RETARDANT POLYOLEFINS

This is a division of application Ser. No. 657,821, filed Feb. 13, 1976, now U.S. Pat. No. 4,096,113 issued June 20, 1978, which was a continuation-in-part of application Ser. No. 488,668, filed July 15, 1974, and now abandoned.

This invention relates to nonburning, nondripping polyolefin compositions. In one of its aspects, it relates to such a composition the limiting oxygen index of which has been increased by use of a suitable additive.

In another of its concepts, the invention provides a nonburning, nondripping polyolefin of suitable limiting oxygen index by incorporating in the composition a phosphorus-containing flame retardant and an ammonium halide salt, for example, ethylenediamine dihydrobromide. In another of its concepts, the invention provides a method for preparing a pigmented polyolefin which has a suitable limiting oxygen index by incorporating together a phosphate flame retardant as herein described and an amine hydrohalide salt, for example, ethylenediamine dihydrobromide.

Flame-retarded olefin polymers and additive systems therefor are described in the art. Phosphorus-containing agents have been found frequently to be highly effective in imparting nonburning and nondripping characteristics to solid polyolefins. An example of such a phosphorus-containing additive is a mixture of ammonium polyphosphate (preferably coated with stearylamine) and dipentaerythritol as disclosed and claimed in U.S. Pat. No. 3,936,416 issued on patent application Ser. No. 382,169, filed July 24, 1973, by me. The disclosure of the identified application for patent is incorporated herein by reference. Further, in U.S. Pat. No. 4,010,137 issued on patent application Ser. No. 641,042 filed by me, there are disclosed additional phosphorus-containing flame retardants for olefin polymers, namely those flame retardants which result when suitable amounts of at least one phosphorus oxide compound of the formula $(P_2O_5)_{0.5-1.0}(H_2O)_{0.0-1.5}$, melamine, and at least one saturated open-chain polyol containing from 5 to 15 carbon atoms and from 4 to 8 hydroxyl groups are combined and heated under such conditions that the resulting product when incorporated into a synthetic resin will not cause significant foaming of the synthetic resin composition when such composition is subjected to molding conditions. The disclosure of said application Ser. No. 641,042 also is hereby incorporated by reference.

I have now found that the effective amounts of such phosphorus-containing fire-retardant additives, to achieve a given level of fire retardancy in a polyolefin composition, can be significantly reduced by additional incorporation of minor amounts of a suitable amine hydrohalide.

The present invention offers several advantages. An increase in fire-retardant properties is obtained with a given polyolefin composition. Conversely, a desired level of fire-retardant properties can be maintained even though the level of phosphorus-containing additive is substantially reduced. This latter advantage is important because the incorporation of nonpolymeric materials into a polyolefin composition significantly disturbs the properties of the original polyolefin. Hence, it is frequently advantageous to keep the total additive loading as low as possible consistent with desired fire-retardant properties. It has been found that the total loading of fire-retardant additives, using the additive system of the present invention, can be substantially reduced without significant sacrifice of fire-retardancy characteristics.

Still another advantage of the present invention is that it can be employed to counteract the detrimental effects of the presence of pigments. It has been unexpectedly found that a number of pigments appear to reduce the effectiveness of the phosphorus-containing fire-retardant additive such that a greater quantity of additive must be used in the presence of the pigments. It has now been found that the incorporation of suitable amine hydrohalide additives overcomes this detriment.

For purposes of clarity, the term "pigments" refers to those high colorant materials, generally inorganic in nature, which are well known in the resins and plastics fabrication art; and whose purpose is to provide the desired color or tint in the articles fashioned from polyolefins. Some commonly used pigments include sodium aluminum silicate disulfide (ultramarine), carbon black (black), cadmium sulfide (yellow), chromium oxide (green), and titanium oxide (white). Thus, while materials such as antimony oxide or phosphate-type fire-retardant additives sometimes provide some color or opacity to articles, it is to be noted that these are not ordinarily considered pigments in the above sense. My studies have shown that the incorporation of from about 0.5 to about 4 parts of blue and/or black pigment per hundred parts of polymer can result in a lowering of the limiting oxygen index of polyolefin compositions protected with the phosphorus-containing flame-retardant additives described in the above-mentioned applications for United States patents. I have also discovered that this lowering effect can easily be overcome by the addition of an amine hydrohalide, e.g., ethylenediamine dihydrobromide prepared according to the following reaction:

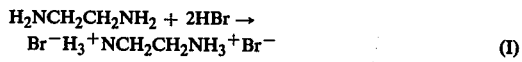

$$H_2NCH_2CH_2NH_2 + 2HBr \rightarrow Br^-H_3{}^+NCH_2CH_2NH_3{}^+Br^- \quad (I)$$

An object of this invention is to produce a nonburning, nondripping solid polyolefin composition. Another object of this invention is to provide a method for producing such a composition. A further object of this invention is to improve the limiting oxygen index of a composition as herein described by incorporating therewith a suitable additive.

Other aspects, concepts, objects, and several advantages of the invention are apparent from the study of this disclosure and the appended claims.

According to the present invention, polyolefin compositions of increased fire retardancy are obtained by incorporating into such compositions a mixture of at least one suitable phosphorus-containing additive and at least one suitable amine hydrohalide salt additive.

Also according to the present invention, a pigmented polyolefin, for example, a propylene-ethylene copolymer containing a blue and/or black pigment or other pigment reducing the limiting oxygen index of the final composition relative to that which it would have without the pigmentation, has incorporated therein a phosphorus-containing agent, for example, as herein described, together with a minor amount of an amine hydrohalide salt, for example, ethylenediamine dihydrobromide.

The preferred phosphorus-containing flame retardants are those which result when suitable amounts of at least one phosphorus oxide compound of the formula $(P_2O_5)_{0.5-1.0}(H_2O)_{0.0-1.5}$, melamine, and at least one saturated open-chain polyol containing from 5 to 15 carbon atoms and from 4 to 8 hydroxyl groups are combined and heated under such conditions that the resulting product when incorporated into a synthetic resin will not cause significant foaming of the synthetic resin composition when such composition is subjected to molding conditions. Generally, it is considered that flame retardancy will be provided if when the additive is being prepared each of the three above-named ingredients is employed in amounts in the range of from about 1 to about 100 parts by weight.

Included within the presently preferred phosphorus-containing flame retardants are those prepared from (1) melamine pyrophosphate and dipentaerythritol;

(2) phosphoric acid, urea, dipentaerythritol and melamine; or (3) phosphoric acid, phosphorus pentoxide, melamine, and at least one of pentaerythritol, dipentaerythritol and tripentaerythritol.

The invention is particularly applicable to compositions of solid polyolefin homopolymer or copolymer in which the phosphate flame retardant component is a reaction product of ortho-phosphoric acid, phosphorus pentoxide, melamine and at least one of pentaerythritol, dipentaerythritol and tripentaerythritol. The above-mentioned application for patent Ser. No. 641,042 discloses the preparation of such phosphorus-containing flame retardant to which the invention is particularly applicable, namely embodiment IV especially as described in Examples IV and V of said application. Thus, one of the now-preferred final compositions of the invention is one which contains the reaction product of orthophosphoric acid, phosphorus pentoxide, melamine and at least one of pentaerythritol, dipentaerythritol, and tripentaerythritol together with the amine hydrohalide salt.

The amine hydrohalide salt, for example, the ethylenediamine dihydrobromide, will be employed in an amount in a range of from about 1 to about 10 parts by weight per hundred parts by weight of polyolefin (php).

The proportions of the components in the just-described preferred phosphorus-containing additive and the conditions under which they are chemically combined will be selected to provide a phosphorus-containing composition which imparts fire retardant properties when incorporated into a solid polyolefin. For example, the components can be reacted in the following approximate molar ranges: phosphoric acid:phosphorus pentoxide:melamine:erythritol: 0.5 to 1.5:2 to 3:2 to 3:0.5 to 2.5, at a temperature within the approximate range of 100°–300° C. for a period of time suitable to provide the fire-retardant additive, say for 1 to 25 hours. It is presently preferred to de-gas the phosphorus-containing additive prior to use by exposing the additive to a temperature of 200°–300° C. for a time sufficient to remove volatiles which might otherwise cause foaming in the molding of the polyolefin composition.

It should be noted that instead of employing phosphoric acid and phosphorus pentoxide to produce the phosphorus-containing flame retardant used in connection with this invention, one can employ a suitable amount of a condensed phosphoric acid as pointed out in application Ser. No. 641,042. Also, if desired, minor amounts of materials can be added to the phosphate-containing additive during its preparation to improve its color, physical handling properties, and the like.

It is considered that this invention will be beneficial for improving the fire resistance of any normally flammable polyolefin. Examples of normally solid polyolefins that can be rendered flame retardant in accordance with this invention include polymers of mono-alpha-olefins having the general formula $CH_2=CHR$ wherein R represents hydrogen or a hydrocarbyl radical selected from the group consisting of aryl, alkyl, cycloalkyl, alkaryl, and aralkyl, said R having up to a total of 10 carbon atoms in each R group. Typical polymers are the homopolymers of ethylene, propylene, butene-1, isobutylene, pentene-1, styrene, and dimethylstyrene or the copolymers or terpolymers of two or more of those alpha-olefins. Such polymers can be prepared by any suitable process which produces a normally solid polyolefin resin. A copolymer with very desirable characteristics is propylene-ethylene copolymer in which the ethylene comonomer is present in amounts ranging from about 2 to about 25, preferably from about 5 to about 15 weight percent based on the copolymer composition.

The hydrohalides of mono- and diamines are contemplated as being useful in the present invention, particularly the hydrochlorides and hydrobromides. These amine hydrohalides can be primary, secondary or tertiary with the amino group attached to or incorporated within a hydrocarbyl radical which is aromatic or aliphatic containing from about 2 to 24 carbon atoms. Representative amine hydrohalides include those produced from amines such as: ethylenediamine, triethylamine, aniline, pyridine, piperidine, propylenediamine, cyclohexylamine, benzylamine, hexamethylenediamine, tert-butylamine, trimethylamine, N-ethylcyclohexylamine, di-sec-butylamine, dibenzylamine, melamine, diethylamine, n-dodecylamine, p-toluidine, p-chloroaniline, 1-naphthylamine dicyclohexylamine, trioctylamine and the like. The hydrobromides of such amines are presently preferred.

In practicing the present invention, the pigment level usually will vary over the range of from about 0 to about 20 parts by weight per hundred parts by weight of polyolefin (php). Generally when pigments are employed those skilled in the art prefer to employ 0.5 to 4.0 php. The decrease in oxygen index resulting from the inclusion of pigments in flame retardant formulations containing 20 to 55 php of phosphate additive can be overcome by the addition of from about 1 to about 10 php of the amine hydrohalide, e.g., ethylenediamine dihydrobromide, to the formulation. More preferably about 25 to 40 php of phosphorus-containing additive is employed in combination with about 2 to about 6 php of amine hydrohalide. Frequently the detrimental effect of the pigment on the flammability of the composition can be overcome by increasing hydrohalide and decreasing phosphate levels so that the total parts of flame retardant additive (e.g., phosphate level plus hydrohalide level) remain constant. However, in general, whether or not pigment is employed, the relative amounts of phosphate, hydrohalide and pigment will be dependent upon the properties desired in the pigmented flame retardant polyolefin composition.

Any suitable procedure can be used for incorporating the pigments, the phosphate flame retardant, and the amine hydrohalide into the polyolefin. Usually the polyolefin is heated to a temperature above its melting point and the various additives are dispersed therein, in any order, by milling or other suitable means until a uniform dispersion is obtained. Thereafter, the nonburning, nondripping pigmented polyolefin composition is extruded, granulated or formed into articles of manufacture as desired.

The preparation of a copolymer of propylene-ethylene which is one resin to which the invention is applicable is described in U.S. Pat. No. 3,689,595 issued Sept. 5, 1972, to inventor J. S. Gwinn.

The following examples will further illustrate the effectiveness of the present inventive composition.

EXAMPLE I

A solution of 20 g (0.33 mole) ethylenediamine in 100 ml distilled water was placed in a 300 ml round bottomed flask equipped with a magnetic stirring device and an addition funnel containing 120 g of 47% hydrobromic acid (56.7 g HBr, 0.70 mole HBr). After cooling the contents of the reaction flask in an ice bath, the hydrobromic acid was added dropwise over a period of 35 minutes to the stirred aqueous ethylenediamine solution. After the addition of the hydrobromic acid, the water was removed in vacuo until a slush-like residue remained. A slurry of the residue in 75 ml of absolute ethanol was filtered to give a white solid. This white solid was washed with 50 ml of absolute ethanol, isolated by filtration and dried to give 55 g of ethylenediamine dihydrobromide as white crystals.

EXAMPLE II

A 119 g (0.84 mol) sample of phosphorus pentoxide was placed in a two liter beaker equipped with a stirrer, addition funnel and nitrogen inlet tube. After the dropwise addition of 38 g of 85% phosphoric acid (0.33 mol $H_3PO_4$), the mixture was stirred an additional 15 minutes before the addition of 68 g (0.5 mol) pentaerythritol and 12.5 g (0.1 mol) melamine. The stirred mixture was heated at 105°–125° C. over a period of 5.5 hours and then allowed to stand at room temperature for a period of about 15 hours.

The reaction mixture was heated to 175° C. and an additional 76 g (0.61 mol) melamine was added in portions over a 40 minute period. During this addition the temperature was increased to about 205° C. and the reaction mixture was almost solid. The reaction mixture was maintained at 235°–250° C. for about 3 hours after all the melamine had been added. The reaction mixture was cooled to room temperature and 349.5 g product was ground to a beige colored powder.

A 200 g portion of the above powder was heated in an oven at 250° C. for a period of 2.5 hours. During this heat treatment the sample foamed, lost 12.6 g in weight, and turned from a beige color to a tan color. This material is a phosphorus-containing flame retardant within the scope of the present invention.

EXAMPLE III

The phosphorus-containing flame retardant prepared in Example II, pigments, and ethylenediamine dihydrobromide were blended in copolymer on a three-inch roll mill for 5 minutes at 320°–350° F. to give the additive levels (php) shown in Runs 1–8 of Table I. The copolymer had melt flow of 3 and flexural modulus of 143,000 psi. The blended materials were molded in picture frame molds at about 400° F. to give sheets of material from which 5" × 12" × ⅛" test slabs were cut to use in the flammability tests. The results of these tests are shown in Table I under "Burning Results."

Table I

Flame Retardancy Data On Pigmented Propylene-Ethylene Copolymer Containing Black and Blue Pigments

| Run No. | PCFR[g] Level (php) | EDDH[a] Level (php) | Pigment Level (php) | Total Flame Retardant Additives (php) | Burning O.I.[c] | Results[b] D-635[d] |
|---|---|---|---|---|---|---|
| 1 | 50 | 0 | 0 | 50 | 27 | NB |
| 2 | 50 | 0 | Black(3) | 50 | 24 | B |
| 3 | 45 | 5 | Black(3) | 50 | 26 | SE |
| 4 | 50 | 0 | Black(1) | 50 | 24.5 | B |
| 5 | 45 | 5 | Black(1) | 50 | 27 | NB |
| 6 | 50 | 0 | Blue(1) | 50 | 26.5 | SE |
| 7 | 45 | 5 | Blue(1) | 50 | 34 | NB |
| 8 | 0 | 50 | 0 | 50 | NM[e] | NB[f] |

[a]EDDH represents ethylenediamine dihydrobromide.
[b]All formulations were nondripping except as noted in Run 8.
[c]O.I. represents oxygen index defined as the minimum concentration of oxygen expressed as volume percent in a mixture of $O_2$ and $N_2$ that will just support combustion (ASTM D 2863-70).
[d]ASTM D-635 test data: NB represents nonburning, SE represents self-extinguishing, B represents burning.
[e]NM represents not measured.
[f]Nonburning but dripped with little char; formulation also contained 5.5 php $Sb_2O_3$.
[g]Phosphorus-containing flame retardant.

The pigments used in runs 2–7 of Table I are commercially available and commonly used in polypropylene. These pigments as well as the green and yellow pigment containing formulations disclosed in Table II are thermally stable and relatively inert chemically. The blue pigment, runs 6 and 7 in Table I, is a sodium aluminum silicate disulfide (ultramarine pigment) from Frank Davis Co., and the black pigment of runs 2–5 in Table I is Vulcan-9, a finely divided carbon black from Cabot Chemical Co. The parenthetical numbers listed beside the pigment color in Table I are the parts of pigment per hundred parts of polymer.

Referring to Table I, the detrimental effect of the black pigment at 3 php and 1 php can be seen in runs 2 and 4 as evidenced by the decrease in oxygen index (O.I.) from 27 to 24 and 24.5, respectively. It is also to be noted that the pigmented copolymer containing the phosphate retardant alone in runs 2 and 4 rated as B (burning) in the D-635 test whereas the nonpigmented copolymer containing phosphate additive alone in run 1 exhibited an O.I. of 27 and was nonburning (NB) in that test. In accordance with the present invention, the detrimental effect of the black pigment at 3 php and 1 php was overcome by replacing 5 php of the phosphate retardant with 5 php of ethylenediamine dihydrobromide as shown, respectively, in runs 3 and 5.

A similar comparison of the O.I. and D-635 data in runs 6 and 7 of Table I further illustrates the effectiveness of the inventive flame-retardant package in overcoming the detrimental effect of a blue pigment.

Run 8 is included in Table I to demonstrate the flame-retardant effectiveness of ethylenediamine dihydrobromide in copolymer at the 50 php level with 5.5 php $Sb_2O_3$ in the absence of the phosphate flame retardant and pigments. The footnote "f" is pertinent here. Though the composition was nonburning, it dripped with little char.

EXAMPLE IV

Formulations containing the copolymer employed in Example II, the phosphorus-containing flame retardant employed in Example II, and yellow or green pigments are shown in Table II. The "Burning Results" in Table II indicate the detrimental effect of the pigment as evidenced by the decrease in oxygen index (O.I.). The inclusion of ethylenediamine dihydrobromide in the formulation would, it appears, overcome the deleterious effects of the pigments. Run 1 is shown in Table II as a control run in which the phosphate flame retardant alone was used. The yellow pigment is a cadmium sulfide pigment available from Harshaw. The green pigment is a chromium oxide pigment available from Pfizer.

Table II

Flame Retardancy Data On Pigmented Propylene-Ethylene Copolymer Containing Green and Yellow Pigments

| Run No. | PCFR[e] Level (php) | Pigment Level (php) | Burning O.I.[c] | Results D-635[d] |
|---|---|---|---|---|
| 1 | 50 | 0 | 27 | NB |
| 9 | 50 | Green(3) | 25.3 | NB-SE |
| 10 | 50 | Yellow(3) | 26.6 | NB |

[c]As defined in Table I.
[d]As defined in Table I.
[e]Phosphorus-containing flame retardant.

EXAMPLE V

A number of additional runs were carried out in which various homopolymers and copolymers were intimately blended with several batches of phosphorus-containing fire retardants (PCFR) and ammonium halide salt in accordance with the present invention. The resulting compositions were tested for fire retardancy. The results of these tests are shown in Tables III through VIII. Except for the runs shown in Table VIII the polyolefin compositions tested did not contain any pigment.

Table III

Fire Retardancy of Propylene Homopolymer

| Run No. | PCFR[1] Level (php) | EDDH[2] Level (php) | Total Retardants (php) | Burning O.I.[3] | Results UL-94[4] |
|---|---|---|---|---|---|
| 11 | 22.5 | 5 | 27.5 | 30.6 | V-O |
| 12 | 37.5 | 0 | 37.5 | 27.6 | Fail |
| 13 | 40.0 | 0 | 40.0 | 30.6 | V-O |
| 14 | 41.0 | 0 | 41.0 | 32.1 | V-O |
| 15 | 45.0 | 0 | 45.0 | 34.1 | V-O |

[1]Prepared from 141g $P_2O_5$, 46.5g 85% phosphoric acid, 76.1g pentaerythritol, 151g melamine, and 45g octadecanol (color improver).
[2]Ethylenediamine dihydrobromide.
[3]Oxygen Index Test, as described in Table I.
[4]Vertical burning test, Underwriters Laboratory Bulletin 94 (also described in Modern Plastics page 92, October, 1970) except that test specimens were 5" × ⅛" × ⅛" and three applications of flame were used to increase severity of the test; Fail = burning continues for more than 25 seconds; V-II = less than 25 seconds but releases flaming particles; V-I = less than 25 seconds and no flaming particles; V-O = 5 seconds or less and no flaming particles.

The data in Table III show that incorporating ethylenediamine dihydrobromide into a propylene homopolymer which contains a given quantity of the phosphorus-containing flame retardant increased the fire-retardant properties of the polypropylene. Similarly, the incorporation of the ethylenediamine dihydrobromide is shown to permit lower levels of the phosphorus-containing flame retardant while still maintaining a given level of fire retardancy in the polypropylene.

Table IV

Fire Retardancy of Propylene/Ethylene Copolymer

| Run No. | PCFR[1] Level (php) | EDDH[2] Level (php) | Total Retardants (php) | Burning O.I.[3] | Results UL-94[4] |
|---|---|---|---|---|---|
| 16 | 22.5 | 5 | 27.5 | 24.9 | V-O |
| 17 | 22.5 | 0 | 22.5 | 24.1 | Fail |
| 18 | 26.2 | 0 | 26.2 | 24.9 | Fail |
| 19 | 26.8 | 0 | 26.8 | 26.0 | V-II |

Table IV-continued

Fire Retardancy of Propylene/Ethylene Copolymer

| Run No. | PCFR[1] Level (php) | EDDH[2] Level (php) | Total Retardants (php) | Burning O.I.[3] | Results UL-94[4] |
|---|---|---|---|---|---|
| 20 | 40.0 | 0 | 40.0 | 24.9 | V-O |

[1]Prepared from 94g $P_2O_5$, 31g 85% phosphoric acid, 54.4g pentaerythritol, and 101g melamine.
[2]Ethylenediamine dihydrobromide.
[3]Oxygen Index Test, as described in Table I.
[4]Vertical Burning Test, as described in Table III.

The data in Table IV show that incorporating ethylenediamine dihydrobromide into a propylene/ethylene copolymer which contains a given quantity of the phosphate retardant increases the fire retardant properties of the copolymer. Similarly, the incorporation of the ethylenediamine dihydrobromide is shown to permit lower levels of the phosphate to achieve a given level of fire retardancy.

Table V

Fire Retardancy of Ethylene Homopolymer

| Run No. | PCFR[1] Level (php) | EDDH[2] Level (php) | Total Retardants (php) | Burning O.I.[3] | Results UL-94[4] |
|---|---|---|---|---|---|
| 21 | 52.5 | 6.5 | 59.0 | 28.3 | V-O |
| 22 | 55.0 | 0 | 55.0 | 29.3 | V-O |
| 23 | 60.0 | 0 | 60.0 | 28.9 | Fail |
| 24 | 62.5 | 0 | 62.5 | 30.9 | V-O |
| 25 | 65.0 | 0 | 65.0 | 30.3 | V-O |

[1]Prepared from 352g polyphosphoric acid, 136g pentaerythritol, 264.9g melamine, and 36.9g stearic acid (color improver).
[2]Ethylenediamine dihydrochloride.
[3]Oxygen Index Text, as described in Table I.
[4]Vertical Burning Test, as described in Table III.

The data in Table V show the dihydrochloride of ethylenediamine can be used to replace a portion of the phosphate additive and to provide a V-O fire test rating to polyethylene. Polyethylene is seen to require somewhat greater loadings of total fire retardants than polypropylene or propylene/ethylene copolymers.

Table VI

Fire Retardancy of Propylene/Ethylene Copolymer

| Run No. | PCFR[1] Level (php) | EDDH[2] Level (php) | Total Retardants (php) | Burning O.I.[3] | Results UL-94[4] | Tensile[5] psi |
|---|---|---|---|---|---|---|
| 26 | 15.0 | 5 | 20.0 | 26.0 | Fail | 2470 |
| 27 | 17.5 | 5 | 22.5 | 27.3 | Fail | 2390 |
| 28 | 17.5 | 5 | 22.5 | 26.7 | V-O | 2390 |
| 29 | 20 | 5 | 25.0 | 27.3 | V-O | 2310 |
| 30 | 22.5 | 5 | 27.5 | 29.6 | V-O | 2460 |
| 31 | 20.0 | 0 | 20.0 | 26.5 | Fail | 2280 |
| 32 | 25.0 | 0 | 25.0 | 27.8 | V-O | 2310 |
| 33 | 28.0 | 0 | 28.0 | 27.8 | V-O | 2240 |
| 34 | 30.0 | 0 | 30.0 | 28.6 | V-O | 2130 |
| 35 | 31.4 | 0 | 31.4 | 29.1 | V-O | 2160 |

[1]Prepared from 2270g $P_2O_5$, 754g 85% phosphoric acid, 1326g pentaerythritol, 2470g melamine, and 245g stearic acid (color improver).
[2]Ethylenediamine dihydrobromide.
[3]Oxygen Index Test, as described in Table I.
[4]Vertical Burning Test, as described in Table III.
[5]Tensile break (yield).

The data in Table VI show that incorporating ethylenediamine dihydrobromide into the propylene/ethylene copolymer permits the lower levels of the phosphate to achieve a given level of fire retardancy. The data also illustrate the advantages in other physical properties which can be obtained, in many instances, by reducing the total loading of nonpolymeric ingredients in a given plastic formulation, viz., the tensile strength is higher when the loading of nonpolymeric ingredients is lower.

Table VII

Fire Retardancy of Styrene Polymer

| Run No. | PCFR[1] Level (php) | EDDH[2] Level (php) | Total Retardants (php) | Burning O.I.[3] | Results UL-94[4] |
|---|---|---|---|---|---|
| 36 | 35 | 5 | 40 | 27.5 | V-O |
| 37 | 40 | 0 | 40 | 25.7 | Fail |
| 38 | 45 | 0 | 45 | 27.8 | V-O |

[1]Prepared from 142g $P_2O_5$, 46.5g 85% phosphoric acid, 81.6g pentaerythritol, 151.5g melamine, 15g stearic acid (color improver) and 0.2g tetrakis[methylene(3,5-di-tert-butyl-4-hydroxyhydrocinamate)]methane (antioxidant).
[2]Ethylenediamine dihydrobromide
[3]Oxygen Index Test, as described in Table I.
[4]Vertical Burning Test, as described in Table III.

The data in Table VII above show that incorporating ethylenediamine dihydrobromide into a styrene polymer which contains a given quantity of PCFR increases the fire retardant properties of the polystyrene. Similarly, the incorporation of the ethylenediamine dihydrobromide is shown to permit lower levels of the phosphate to achieve a given level of fire retardancy in the polystyrene.

Table VIII

Fire Retardancy of $TiO_2$-Containing Polypropylene

| Run No. | PCFR[1] Level (php) | EDDH[2] Level (php) | $TiO_2$ Level (php) | Total Retardants (php) | Burning O.I.[3] | Results UL-94[4] |
|---|---|---|---|---|---|---|
| 39 | 22.5 | 1.9 | 1.9 | 24.4 | 28.0 | V-II |
| 40 | 22.5 | 1.9 | 3.7 | 24.4 | 27.0 | V-II |
| 41 | 26.8 | 1.9 | 1.9 | 28.7 | 28.6 | V-O |

[1]Same phosphate batch as in Table IV.
[2]Ethylenediamine dihydrobromide.
[3]Oxygen Index Test, as described in Table I.
[4]Vertical Burning Test, as described in Table III.

The data in Table VIII above show that the presence of $TiO_2$ pigment in polypropylene compositions containing PCFR and ethylenediamine dihydrobromide renders the composition more difficult to treat in that greater amounts of the PCFR are required to achieve a given level of fire retardancy.

Reasonable variation and modification are possible within the scope of the foregoing disclosure. The foregoing examples and specific illustrations are not to be construed as unduly limiting the subject matter of this invention.

What is claimed is:

1. A flame-retardant polyolefin composition comprising normally solid polyolefin, a hydrohalide salt of a mono- or diamine in which the amine group is attached to or incorporated within a hydrocarbyl radical which is aromatic or aliphatic containing 2 to 24 carbon atoms, and a phosphorus-containing flame retardant produced by combining reactants comprising ortho-phosphoric acid, urea, dipentaerythritol, and melamine under suitable conditions, said suitable conditions comprising employing amounts of said reactants suitable for yielding said phosphorus-containing flame retardant and heating said combined reactants at a temperature suitable for yielding said phosphorus-containing flame retardant for a period which will assure that said phosphorus-containing flame retardant will not cause significant foaming of the polyolefin composition when said polyolefin composition is subjected to molding conditions.

2. A flame-retardant polyolefin composition according to claim 1 wherein said polyolefin contains about 1 to about 10 php of said hydrohalide and about 20 to about 55 php of said phosphorus-containing flame retardant and said hydrohalide is a hydrobromide or a hydrochloride.

3. A flame-retardant polyolefin composition according to claim 2 wherein the hydrohalide is ethylenediamine dihydrobromide.

4. A flame-retardant polyolefin composition according to claim 3 wherein said solid polyolefin is a homopolymer or copolymer of mono-alphaolefins having the general formula $CH_2\!\!=\!\!CHR$ wherein R represents hydrogen or a hydrocarbyl radical selected from the group consisting of aryl, alkyl, cycloalkyl, aralkyl, and alkaryl, said R group having up to 10 carbon atoms.

5. A flame-retardant polyolefin composition according to claim 4 wherein said polyolefin contains up to 20 php of pigment.

6. A flame-retardant polyolefin composition in accordance with claim 5 wherein said phosphorus-containing flame retardant comprises the product that results when from about 30 to about 100 parts by weight of orthophosphoric acid, about 40 to about 125 parts by weight of urea, about 3 to about 90 parts by weight of melamine, and about 5 to about 90 parts by weight of dipentaerythritol, are combined and reacted under said suitable conditions.

7. A flame-retardant polyolefin composition in accordance with claim 2 wherein said phosphorus-containing flame retardant comprises the product that results when from about 30 to about 100 parts by weight of orthophosphoric acid, about 40 to about 125 parts by weight of urea, about 3 to about 90 parts by weight of melamine, and about 5 to about 90 parts by weight of dipentaerythritol, are combined and reacted under said suitable conditions.

8. A flame-retardant polyolefin composition comprising normally solid polyolefin, a hydrohalide salt of a mono- or diamine in which the amine group is attached to or incorporated within a hydrocarbyl radical which is aromatic or aliphatic containing 2 to 24 carbon atoms, and a phosphorus-containing flame retardant produced by combining reactants comprising melamine pyrophosphate and dipentaerythritol under suitable conditions, said suitable conditions comprising employing amounts of said reactants suitable for yielding said phosphorus-containing flame retardant and heating said combined reactants at a temperature suitable for yielding said phosphorus-containing flame retardant for a period which will assure that said phosphorus-containing flame retardant will not cause significant foaming of the polyolefin composition when said polyolefin composition is subjected to molding conditions.

9. A flame-retardant polyolefin composition according to claim 8 wherein said polyolefin contains about 1 to about 10 php of said hydrohalide and about 20 to about 55 php of said phosphorus-containing flame retardant and said hydrohalide is a hydrobromide or a hydrochloride.

10. A flame-retardant polyolefin composition according to claim 9 wherein the hydrohalide is ethylenediamine dihydrobromide.

11. A flame-retardant polyolefin composition according to claim 10 wherein said solid polyolefin is a homopolymer or copolymer or mono-alphaolefins having the general formula $CH_2\!\!=\!\!CHR$ wherein R represents hydrogen or a hydrocarbyl radical selected from the group consisting of aryl, alkyl, cycloalkyl, aralkyl, and alkaryl, said R group having up to 10 carbon atoms.

12. A flame-retardant polyolefin composition according to claim 11 wherein said polyolefin contains up to 20 php of pigment.

13. A flame-retardant polyolefin composition in accordance with claim 8 wherein said phosphorus-containing flame retardant comprises the product that results when the weight ratio of said melamine pyrophosphate to said dipentaerythritol is in the range of about 14:1 to about 0.25:1.

14. A flame-retardant polyolefin composition in accordance with claim 9 wherein said phosphorus-containing flame retardant comprises the product that results when the weight ratio of said melamine pyrophosphate to said dipentaerythritol is in the range of about 14:1 to about 0.25:1.

15. A flame-retardant polyolefin composition comprising normally solid polyolefin, a hydrohalide salt of a mono- or diamine in which the amine group is attached to or incorporated within a hydrocarbyl radical which is aromatic or aliphatic containing 2 to 24 carbon atoms, and a phosphorus-containing flame retardant consisting essentially of ammonium polyphosphate and dipentaerythritol wherein the weight ratio of ammonium polyphosphate and dipentaerythritol is in the range of 6:1 to 1:1.

* * * * *